United States Patent [19]

Sakamoto

[11] Patent Number: 4,719,509
[45] Date of Patent: Jan. 12, 1988

[54] VIDEO DATA INTERPOLATION APPARATUS

[75] Inventor: Tomosada Sakamoto, Tokyo, Japan

[73] Assignee: Yokogawa Medical Systems, Limited, Tokyo, Japan

[21] Appl. No.: 908,809

[22] PCT Filed: Jan. 10, 1985

[86] PCT No.: PCT/JP85/00010
§ 371 Date: Aug. 18, 1986
§ 102(e) Date: Aug. 18, 1986

[87] PCT Pub. No.: WO86/04176
PCT Pub. Date: Jul. 17, 1986

[51] Int. Cl.$^4$ .......................... H04N 5/30; H04N 7/01
[52] U.S. Cl. .................................... 358/112; 358/140; 128/660
[58] Field of Search ................ 358/112, 140; 364/577; 128/660

[56] References Cited

U.S. PATENT DOCUMENTS

| | | | |
|---|---|---|---|
| 4,245,250 | 1/1981 | Tieman | 358/140 |
| 4,310,907 | 1/1982 | Tachita et al. | 358/112 |
| 4,618,887 | 10/1986 | Birk | 128/660 |
| 4,649,927 | 3/1987 | Fehr et al. | 128/660 |

FOREIGN PATENT DOCUMENTS

| | | |
|---|---|---|
| 51-137344 | 11/1976 | Japan . |
| 57-73785 | 5/1982 | Japan . |
| 57-73787 | 5/1982 | Japan . |
| 57-146288 | 9/1982 | Japan . |

Primary Examiner—Howard W. Britton
Assistant Examiner—John K. Peng
Attorney, Agent, or Firm—Moonray Kojima

[57] ABSTRACT

The invention provides a video data interpolation apparatus which can readily produce a number of data sets by interpolation. The apparatus comprises some pairs of buffer memories and an interpolation circuit, the two buffer memories of each pair alternately temporarily storing data sets regarding an image, the data sets being given successively. The currently incoming data is written bit by bit to one buffer memory of first pair and also to one buffer memory of second pair. In step with this writing operation, the immediately previous data set is read from the other memory of the second pair. Then, data sets are interpolated between the data set read from the other memory of the second pair and the currently incoming data set, based on these two data sets. The data sets obtained by interpolation are written to one buffer memory of third pair and also to each one buffer memory of subsequent pair or pairs. Concurrently with the writing of data to the buffer memories and reading of data from other memory, the values stored in the other memory of the first pair, the other memory of the third pair, and the other or others of the subsequent pair or pairs are read and stored in a video memory.

6 Claims, 2 Drawing Figures

VIDEO DATA INTERPOLATION APPARATUS

DESCRIPTION

1. Technical Field

The present invention relates to an apparatus for inserting one or more data sets between data sets concerning an image by interpolation, the inserted data sets being associated with the latter data sets. More specifically, the invention relates to a video data interpolation apparatus that is preferably used as an apparatus for interpolating video data between video data stored in the memory of an ultrasonograph.

2. Background Art

Japanese Patent Laid-Open No. 73785/1982 discloses a video data interpolation apparatus which inserts, by interpolation, a data set between video data sets stored in the memory of a sector-scan type ultrasonograph, the inserted data set being associated with the latter data sets. This apparatus uses three buffer memories for temporarily storing video data derived by a sector scan using scanning acoustic lines. More specifically, three acoustic lines are successively scanned to obtain three data sets, which are temporarily stored in their respective buffer memories. While the newest data set is being written to one buffer memory, data about an image are read at a high speed from the other two in a given sequence. The data read out are successively arithmetically processed to interpolate an intermediate data set between the data set obtained two sets previously to the presently written data set and the present data set. The resulting data sets are stored in their respective memories.

In this interpolation apparatus, while the newest data set concerning an image is being written to one buffer memory, the intermediate data set next to the data set that is two sets previous to the current set must be obtained by interpolation, and the obtained data set is stored in a memory. For this purpose, data must be read from some buffer memory at a higher speed than the speed at which data is written to it. That is, when the data set obtained by interpolation is one in number, data must be read from some buffer memory at a speed twice as high as the speed at which data is written to it. When the data sets derived are two in number, data must be read from some memory at a speed three times as high as the speed at which data is written to it. In this way, as the data sets obtained by interpolation increase in number, a higher reading speed is needed. Therefore, it is difficult to obtain a number of data sets by interpolation.

DISCLOSURE OF THE INVENTION

It is the object of the present invention to provide a video data interpolation apparatus which can readily produce a number of data sets by interpolation.

This object is achieved in accordance with the teachings of the invention by an apparatus comprising some pairs of buffer memories and an interpolation circuit, the two buffer memories of each pair alternately temporarily storing data sets regarding an image, the data sets being given successively. The currently incoming data is written bit by bit to one buffer memory of first pair and also to one buffer memory of second pair. In step with this writing operation, the immediately previous data set is read from the other of the second pair. Then, one or more data sets are interpolated between the data set read from the other of the second pair and the currently incoming data set, based on these two data sets. The data sets obtained by interpolation are written to one buffer memory of third pair and also to each one buffer memory of the subsequent pair or pairs. Concurrently with the writing of data to the buffer memories and reading of data from other memory, the values stored in the other of the first pair, the other of the third pair, and the other or others of the subsequent pair or pairs are read and stored in a video memory.

BEST MODE FOR CARRYING OUT THE INVENTION

Figure 1:
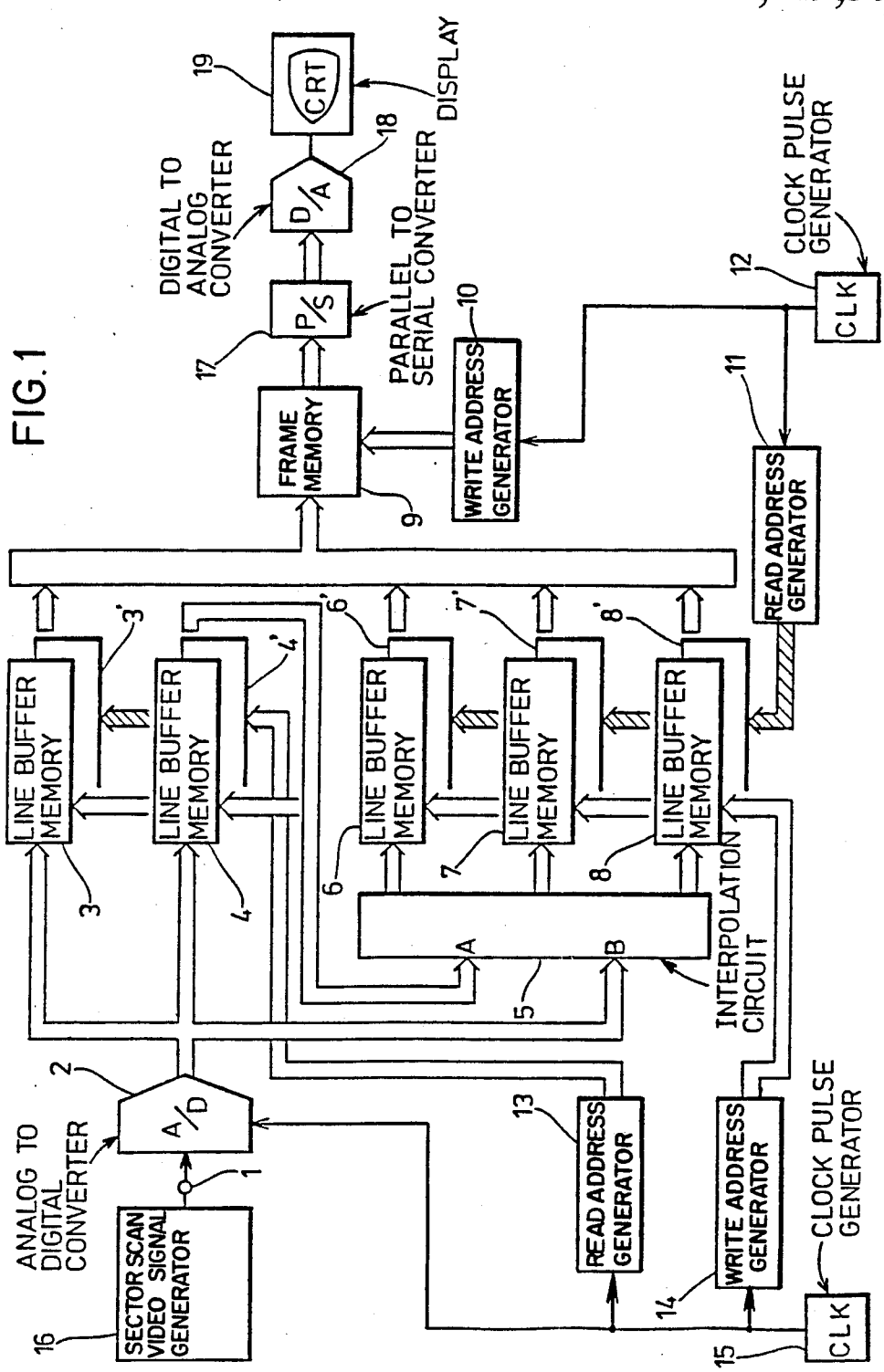
FIG. 1 is a block diagram of a video data interpolation apparatus fabricated in accordance with the invention for use in a sector-scan type ultrasonograph to obtain video data by interpolation.

Referring to FIG. 1, a sector scan video signal generator 16 produces a sector scan video signal in analog form. Whenever a new acoustic line is scanned, this video signal is supplied to the input terminal 1 of an analog-to-digital converter 2. The generator 16 is common with the main portions of a well known sector-scan type ultrasonograph. For example, the generator includes ultrasonic transducers, transducer driver circuits, an echo signal receiver circuit, an analog video signal generator circuit, and circuits for controlling these circuits. The instantaneous value of the analog sector scan video signal applied to the A/D converter 2 is converted into digital form each time a certain sampling period elapses. This period depends on the clock pulses delivered from a clock pulse generator 15. The resulting digital data is sent to a first pair of buffer memories 3 and 3', a second pair of buffer memories 4 and 4', and input port B of an interpolation circuit 5.

Each of the memories 3, 3', 4, 4' has a storage capacity sufficient to store a data set obtained by scanning an object with a single acoustic line. Accordingly, these buffer memories may hereinafter referred to as the "line buffer memories". The data delivered from the A/D converter 2 is written to one of the memories 3 and 3' in accordance with writing addresses produced from a write address generator 14. The data stored in the other memory is read out in accordance with read addresses generated by a read address generator 11. The roles of the line buffer memories 3 and 3', i.e., the writing of data to one memory and the reading of data from the other, are interchanged by a switching mechanism (not shown) whenever a new acoustic line is scanned. The output data from the A/D converter 2 is written to one of the second pair of line buffer memories 4 and 4' in accordance with write addresses given by the write address generator 14. The data stored in the other memory is read out in accordance with read addresses produced by another read address generator 13. The roles of the memories 4 and 4', i.e., the writing and reading of data, are interchanged by another switching mechanism (not shown) whenever a new acoustic line is scanned, in the same manner as in the case of the first pair of memories 3 and 3'. The read address generator 13 and the write address generator 14 produce the same addresses. The address signals from these generators 13 and 14 are updated in synchronism with the operation of the A/D converter 2 in accordance with the clock pulses from the clock pulse generator 15. The read address generator 11 updates its output addresses not synchronously with the operation of the A/D converter 2 in accordance with the clock pulses from the other clock pulse generator 12. Thus, the digital video data currently delivered from the A/D converter 2 is written to one of the first pair of memories 3 and 3' and also to one of the second pair of memories 4 and 4', while the digital video data obtained by the use of the previous acoustic line and delivered previously from the A/D converter is read from the others of the first and second pairs.

Applied to input port A of the interpolation circuit 5 is the video data set read from the other of the second pair of line buffer memories 4 and 4', i.e., the data obtained using the immediately previous acoustic line. The interpolation circuit 5 finds data sets, say three sets, interpolated between the two data sets appearing at the input ports A and B, respectively, and obtained using two successive acoustic lines. The three data sets obtained by interpolation are fed to a third pair of line buffer memories 6, 6', a fourth pair of line buffer memories 7, 7', and a fifth pair of line buffer memories 8, 8', respectively. The number of the data sets derived by interpolation can be arbitrarily selected. The interpolation circuit 5 consists of a microprocessor or the like. The addresses of these buffer memories at which data are written are produced from the write address generator 14. The addresses of these buffer memories at which data are read out are generated from the read address generator 11. The roles of these memories, i.e., the writing and reading of data, are interchanged whenever a new acoustic line is produced, in the same way as in the cases of the first and second pairs of line buffer memories. Thus, the three interpolated data sets now delivered from the interpolation circuit 5 are written to one memory of the third pair, one memory of the fourth pair, and one memory of the fifth pair, respectively. The three interpolated data sets previously delivered from the interpolation circuit are read from the other memories of these three pairs. The write address generator 14 sends the same addresses to the first through fifth pairs of line buffer memories. Also, the read address generator 11 furnishes the same addresses to the first, third, fourth, and fifth pairs of memories.

The data read from the others of the first, third, fourth, and fifth pairs of line buffer memories are fed to a frame memory 9 and written to this memory 9 in accordance with addresses which are generated by a write address generator 10 in response to the clock pulses from the clock pulse generator 12. Since the address generators 10 and 11 receive the same clock pulses from the clock pulse generator 12, data are read from the others of the first, third, fourth, and fifth pairs of memories simultaneously with the writing of data to the frame memory 9. For instance, data is first read from the other of the first pair of memories 3 and 3' and written to the main memory 9 at certain addresses. Then, reading of data from the third pair of memories 6 and 6' and writing of data to the frame memory 9 are similarly carried out. Then, reading of data from the fourth and fifth pairs of memories and writing of data to the frame memory 9 are effected in the same fashion. The reading of data from the others of the first, third, fourth, and fifth pairs and the writing of data to the frame memory 9 are executed while data are being written to one memory of each of these pairs.

Data is written to the frame memory 9 at addresses corresponding to pixels on acoustic lines used for a sector scan. The data read from the other of the first pairs of memories 3 and 3' is stored at addresses corresponding to pixels on the acoustic line immediately preceding the acoustic line which was used to obtain data presently delivered from the A/D converter 2. The data read from the other memories of the third, fourth, and fifth pairs are stored at addresses corresponding to pixels on three acoustic lines, respectively, which are interpolated between the immediately preceding acoustic line and the one more preceding acoustic line.

Figure 2:
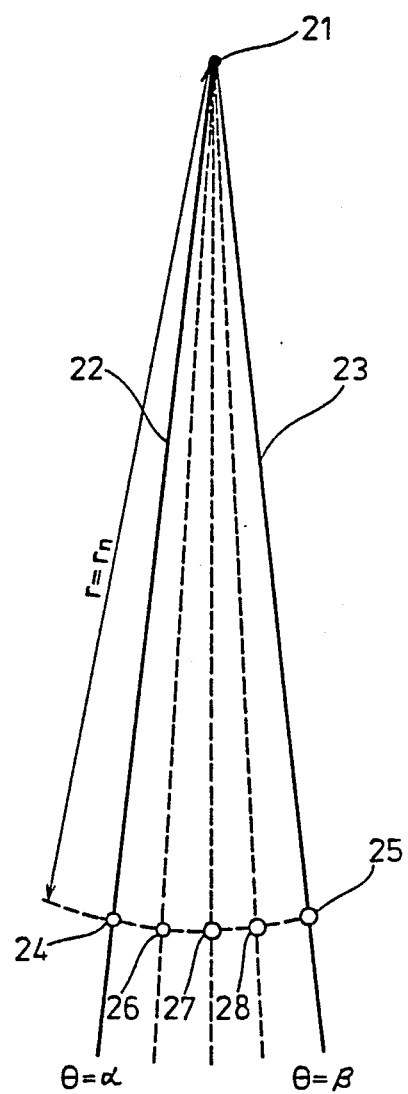
FIG. 2 is a diagram for illustrating the operation of the apparatus shown in FIG. 1.

The manner in which data is stored in the frame memory 9 is described below in further detail by referring to FIG. 2. It is now assumed that the A/D converter 2 currently delivers data obtained at position 25 on an acoustic line at a distance $r_n$. This data is fed to the pairs 3, 3' and 4, 4' of the line buffer memories and written to one of each pair of these memories at addresses corresponding to the distance $r_n$. This data is also supplied to the input port B of the interpolation circuit 5. Data obtained at position 24 on the immediately preceding acoustic line at the same distance is read from the other of each pair of these memories. The data obtained at position 24 and read from the other of the memory pair 4, 4' is supplied to the input port A of the interpolation circuit 5, the input port B of which receives the data, obtained at position 25, from the A/D converter 2. The interpolation circuit 5 generates intermediate data corresponding to positions 26, 27, 28 by interpolation, based on the data obtained at positions 24 and 25. The interpolated data sets are written to one of each pair of the memories 6, 6', 7,7', 8,8' at addresses corresponding to the distance $r_n$.

The data successively produced by the A/D converter 2 are similarly processed. When the A/D converter 2 has delivered all the data on the acoustic line 23, all the data on the acoustic line 23 are stored in one of each pair of the memories 3, 3', 4, 4'. Concurrently, the three data sets interpolated between the data sets obtained using the acoustic lines 22 and 23 are stored in the memory 6 or 6', memory 7 or 7', and memory 8 or 8', respectively. Therefore, some interpolated data sets are provided simultaneously with getting data using one acoustic line, without the need to repeatedly and rapidly read data from buffer memories, which would have heretofore been required.

Meanwhile, all the data on the acoustic line 22 are successively read from the other of the memories 3 and 3' and stored in the frame memory 9. Namely, the memory 9 receives video data with a delay corresponding to one scanning acoustic line.

All the data on the acoustic line 23 stored in one of each pair of the memories 3, 3', 6, 6', 7, 7', 8, 8' and the three data sets interpolated between the data sets obtained using the acoustic lines 22 and 23 are successively read out as the next acoustic line is started. Then, the data are stored in the frame memory 9, corresponding to each different acoustic line. In this way, the frame memory 9 has two data sets corresponding to two actual, neighboring acoustic lines and three data sets interpolated between them. These data sets are fed to a display device 19 via a parallel-to-serial converter 17 and a digital-to-analog converter 18 to display an image obtained by a sector scan.

The novel video data interpolation apparatus operates most effectively when it uses data produced by a sector scan, but the invention is not restricted to apparatuses processing video data collected by a sector scan. If the write address generator 10 for the frame memory 9 is appropriately designed, the invention may be applied either to interpolation of video data generated by a linear scan or to interpolation of video data obtained by a convex scan.

I claim:

1. A video data interpolation apparatus for inserting one or more video data sets between a plurality of video data sets by interpolation and for storing all the data sets including the inserted data sets in a video memory, the inserted video data sets being associated with the plurality of video, data sets which are successively given by a predetermined length, said apparatus comprising:

two first buffer memories each of which has a storage capacity sufficient to store one video data set and each of which receives the video data sets not interpolated;

two second buffer memories each of which has a storage capacity sufficient to store one video data set and each of which receives the video data sets not interpolated;

an interpolating means having two inputs one of which receives a video data set not interpolated, the other receiving the video data set read from the second buffer memories by a reading means, the interpolating means producing one or more sets of video/data sets by interpolation, based on the video data sets applied to the two inputs;

one or more pairs of third buffer memories including two buffer memories each of which has a storage capacity sufficient to store one video data set, the third buffer memories being provided corresponding to number of interpolated video data sets delivered from the interpolating means, the third buffer memories receiving their respective interpolated video data sets;

a writing means for writing the input video data set alternately to the two buffer memories of each pair of the first, second, and third buffer memories;

said reading means for reading video data from those of the first, second, and third buffer memories to which data is not written by the writing means; and said video memory for storing the video data sets read from the first and third buffer memories by the reading means.

2. The video data interpolation apparatus of claim 1, wherein said reading means comprises a first reading means for reading data from the first and third buffer memories and a second reading means for reading data from the second buffer memories.

3. The video data interpolation apparatus of claim 2, wherein said second reading means and said writing means are clocked by common first clock pulses, and wherein said first reading means is clocked by second clock pulses independent of the first clock pulses.

4. The video data interpolation apparatus of claim 1, wherein each video data set is obtained at the position of a scanning acoustic line emitted by a sector-scan type ultrasonograph.

5. The video data interpolation apparatus of claim 1, wherein each video data set is obtained at the position of a scanning acoustic line emitted by a linear-scan type ultrasonograph.

6. The video data interpolation apparatus of claim 1, wherein each video data set is obtained at the position of a scanning acoustic line emitted by a convex-scan type ultrasonograph.

* * * * *